United States Patent
Baron et al.

(10) Patent No.: US 9,132,890 B2
(45) Date of Patent: Sep. 15, 2015

(54) SELF-ALIGNING SOCKET FOR MOORING CABLE

(75) Inventors: Pierre-Francois Baron, Saint-Denis les Bourg (FR); Benjamin Coutaz, Bourg en Bresse (FR); Serge Bisceglie, Saint-Remy (FR)

(73) Assignee: ArcelorMittal Wire France, Bourg en Bresse (FR)

( * ) Notice: Subject to any disclaimer, the term of this patent is extended or adjusted under 35 U.S.C. 154(b) by 0 days.

(21) Appl. No.: 13/811,563

(22) PCT Filed: Jul. 21, 2011
(Under 37 CFR 1.47)

(86) PCT No.: PCT/FR2011/000382
§ 371 (c)(1),
(2), (4) Date: Sep. 4, 2013

(87) PCT Pub. No.: WO2012/010746
PCT Pub. Date: Jan. 26, 2012

(65) Prior Publication Data
US 2014/0026797 A1    Jan. 30, 2014

(30) Foreign Application Priority Data
Jul. 22, 2010   (FR) ..................... 10 03085

(51) Int. Cl.
*B63B 21/04*    (2006.01)
*F16G 11/00*    (2006.01)
*F16G 11/04*    (2006.01)

(52) U.S. Cl.
CPC ............... *B63B 21/04* (2013.01); *F16G 11/00* (2013.01); *F16G 11/042* (2013.01)

(58) Field of Classification Search
CPC ........................................... B63B 21/04
USPC ....................................... 114/230.28
See application file for complete search history.

(56) References Cited

U.S. PATENT DOCUMENTS

| | | | |
|---|---|---|---|
| 4,068,963 A | 1/1978 | Brandestini | |
| 6,902,418 B2 * | 6/2005 | Watanabe et al. | 439/266 |
| 7,390,032 B2 * | 6/2008 | Hughes | 285/330 |
| 2009/0020061 A1 * | 1/2009 | Dybvik et al. | 114/230.28 |
| 2014/0026797 A1 * | 1/2014 | Baron et al. | 114/230.28 |

FOREIGN PATENT DOCUMENTS

| | | |
|---|---|---|
| FR | 512616 A | 4/1921 |
| FR | 534609 A | 3/1922 |

(Continued)

*Primary Examiner* — Lars A Olson
*Assistant Examiner* — Jovon Hayes
(74) *Attorney, Agent, or Firm* — Davidson, Davidson & Kappel, LLC

(57) ABSTRACT

This socket, intended primarily to be mounted at the end of a mooring cable for an anchoring system of a mobile massive element, comprises a socket body 12 having an internal cavity 14 comprising a guide chamber 34 for the mooring cable 22, an intermediate section 18 and a fastening receptacle 20 intended to receive and block the ends of the strands of the mooring cable 22, and means 30, 30' for coupling with the mobile massive element to be anchored, positioned on the socket body 12 so as to define a pivoting axis 32 of the socket body 12, which axis passes through the intermediate section 18. The use of the socket in anchoring systems, especially in the offshore environment, assures natural self-alignment thereof with the cable on which it is mounted, during the diverse movements by which the anchoring system is affected.

13 Claims, 1 Drawing Sheet

(56) References Cited

FOREIGN PATENT DOCUMENTS

| | | | |
|---|---|---|---|
| FR | 2340484 | A1 | 9/1977 |
| GB | 1193185 | A | 5/1970 |
| GB | 2255354 | A | 11/1992 |

* cited by examiner

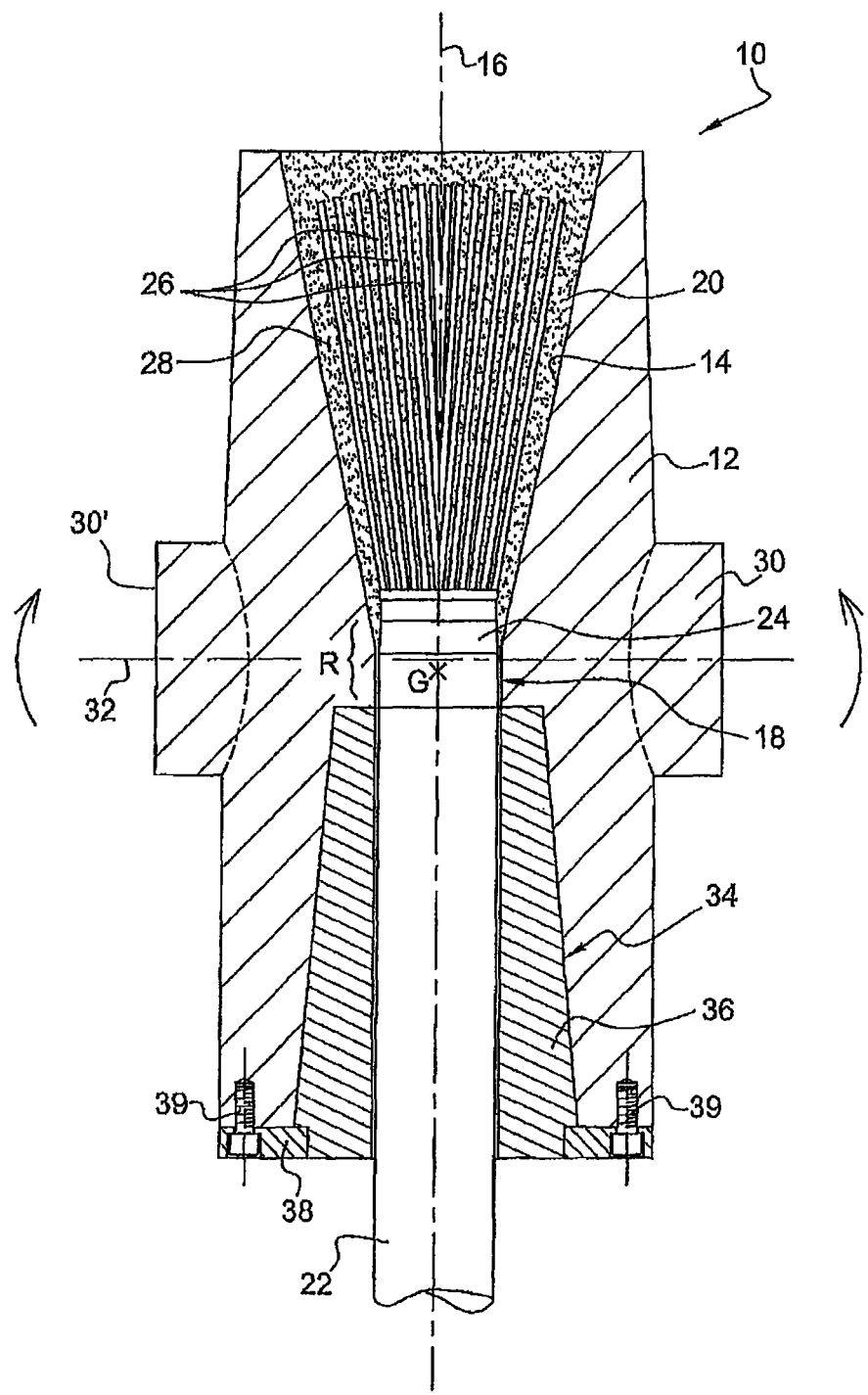

SELF-ALIGNING SOCKET FOR MOORING CABLE

The present invention relates to the field of mooring cables, in particular those used in the maritime environment. It relates more specifically to an end socket for cables of mooring lines, especially of the offshore mooring catenary type for anchoring massive floating elements systems for oil and gas production at sea, albeit without being limited thereto.

In the field of what is known as "offshore" oil and gas production in the marine environment along coasts, mooring cables, also referred to as catenaries, serving for tethering with very high tensile capacity, are used for anchoring massive floating elements such as offshore platforms, loading buoys or even submerged stages of column systems ascending to the surface (SPAR, riser tower system).

The mooring cables, often disposed in anchoring systems converging at the level of the mobile massive floating element to be anchored, are connected by their end sockets (which may or may not be associated with connection pieces) on the one hand to a fixed device anchored on the sea floor and on the other hand to the floating element to be anchored.

It is recalled that such mooring lines may have lengths in excess of one kilometer. Furthermore, this reference length will undoubtedly be increased in the coming years, since undersea prospecting is spreading to progressively deeper waters.

Consequently, the diverse connections and components of the anchoring system at each end of such mooring lines must be able to resist the considerable repetitive strains and forces generated by waves, by marine currents, by winds or even by the different operating stresses of the offshore installation itself. An offshore mooring catenary line actually participates in the movements of waves, so that fatigue strength in particular becomes a substantial requirement, both in tension and in bending, especially where the cable exits its end socket.

Traditional mooring lines equipped with end sockets of clevis, bail or even eye type are known. Such a socket consists mainly of a hollow body of frustoconical general shape forming a fastening receptacle and having, at its broadest end, ears (or a web) pierced by a bore intended to receive a connection shaft or an oval bail intended for the connection with the system to be anchored. By virtue of its undercut shape, the fastening receptacle has a blocking function and for this purpose receives an end of the mooring cable wherein the strands first have been spread out in sheaf form, before being filled with a cast material which, after solidification, makes the cable and the socket irreversibly integral.

Within the different anchoring systems, of overhead type but more particularly are underwater, the mooring lines are subjected to cycles of alternating tensions or repeated bending due to the stresses undergone by the mobile element to be anchored and to the resulting movements. The anchoring systems and the cable-based mooring lines constituting them must then be designed and produced in a manner that takes the conditions of use into account. It is necessary in particular to avoid any concentration of repeated bending stresses at the level of the portion of the mooring cable situated precisely at the outlet of its end socket.

As already indicated in the foregoing, with a view to connecting them to the mobile element to be anchored or to the end-of-line anchors, the end sockets of the cables with which the present anchoring systems are equipped comprise externally, on the side opposite the cable entry, coupling means that assure pivoting fixation of the socket on the element to be anchored. In this way there is accomplished a pivoting coupling which, under the action of the different stresses to which the anchoring system is subjected, permits alternating rotational movements of the socket around an axis orthogonal to its own longitudinal axis. With this type of socket, however, it will be noted that the cable freely exits the socket, precisely at the foot of the expanded sheaf of strands retained in the fastening receptacle, or at a relatively short distance therefrom. Now, by virtue of the torque effect, the weight of the socket is largely sufficient for it to follow the partial rotational movements around its pivoting axis, thus imposing parasitic bending stresses on the cable portion situated at the outlet of the fastening receptacle.

A known solution for overcoming this disadvantage is to limit the parasitic bending stresses induced in the cable at the socket outlet by protecting it with a stiffener.

The installation of such an equipment item is all the more important in view of the fact that the rigidity of the cable in bending will become smaller, or that materials of higher quality will be used to construct it, as in the case of modern high-strength steel cables or else mixed cables made from steel wires and synthetic materials, or even from purely synthetic materials.

Such a stiffener, intended to permit the socket to self-align with its cable, typically has the form of a sleeve installed around the cable at the socket outlet, the rigidity and thickness of which sleeve decrease progressively with increasing distance therefrom. The stiffener, generally made of plastic material of adapted rigidity and consistency, in this way has increasing flexibility from its large base to its tip, thus making it possible to reduce, but only reduce, the risks, sometimes severe, of parasitic bending of the cable at the outlet of its end socket.

The present invention has precisely the main objective of proposing a new type of self-aligning end socket for cables of mooring lines constituting anchoring systems susceptible to being subjected to large cyclic variations of geometry and stresses in the course of their use.

To this end, the invention has as a first objective a self-aligning socket intended to be mounted at the end of a mooring cable for an anchoring system of a mobile massive element, the socket comprising:
  a socket body having an internal cavity comprising a guide chamber for the mooring cable, an intermediate section and a fastening receptacle intended to receive and block the ends of the strands of the mooring cable, and
  means for coupling with the mobile massive element to be anchored, positioned on the socket body in such a manner as to define a pivoting axis of the socket body, which axis passes through the intermediate section of the socket.

Thus it is understood that the employment of the invention has as a first effect forcing the socket to be retained continuously in line with the cable carrying it. This result is due mainly to the presence of a cable-guide chamber in the very body of the socket, which chamber actually functions as an internal stiffener by virtue of its internal wall, which comes into contact with the cable in the manner of a retaining envelope.

In addition, a retaining sleeve of shape complementary to the guide chamber may be inserted therein to receive the mooring cable. For practical reasons of adaptability of the socket to the different possible diameters of the cable, it is understood that it will be advantageous to provide a guide chamber broader than the cable to be guided, so that such a dimensioned retaining sleeve, of shape adaptable according to the needs, can be inserted therein.

In a preferred embodiment, the center of gravity G of the socket is located at the intermediate section and therefore in proximity to its pivoting axis, even on this pivoting axis or else between the pivoting axis and the start of the guide chamber. The pivoting axis of the socket relative to the elements to which it is connected is therefore located in immediate proximity to the point of application, on the socket, of the tensile forces transmitted by the cable during its use within the anchoring system. In this way it is possible to avoid any "lever arm" effect, which would be exerted at the level of the socket itself by imposing an inherent rotational movement around its pivot.

This forced alignment of the socket on its cable therefore permits it to easily follow the movements induced on the cable during its use within the anchoring systems in which it is participating and thus to greatly reduce or even suppress the phenomena of parasitic bending thereof at the cable outlet much better than could be done by a stiffener alone mounted externally on an end socket constructed according to the prior art.

The invention also has as a second object an offshore mooring cable equipped at one of its ends at least with a self-aligning socket according to the invention, the cable being provided with a watertight sheath enveloping an assembly of wires based on steel or synthetic materials or combinations thereof.

The employment of the invention is this field permits a great reduction or even elimination of parasitic bending stresses of mooring cables at the outlet of their end sockets, regardless of whether they are constituted of steel wires, mixed assemblies of steel and synthetic materials or even of synthetic materials alone.

Of course, such a self-aligning socket is suitable for equipping the ends of metal cables, generally employed within diverse anchoring or mooring systems, including those commonly employed during offshore oil and gas production. However, it proves to be even more advantageous in the case of mixed cables constituted of a core of steel and synthetic materials, or even constituted solely of a core of synthetic materials, since such cables have much less rigidity in bending than does a cable composed purely of a core of steel wires.

Preferably, the coupling means comprise a pair of journals extending perpendicular to the longitudinal axis of the socket. Such journals permit a pivoting connection by engaging, for example in seats of corresponding diameter provided on the mobile element to be anchored or on the fixed end-of-line point, for example in the form of a bayonet clamp.

The means for coupling the socket may also have the form of eyelets or circular bores, in which the journals provided on the mobile element to be anchored or on the fixed end-of-line point engage.

The fastening receptacle that receives the sheaf of wires emerging from the cable end prepared for fastening may be of any shape that permits fastening and wedging of the cable in the socket. Preferably it will be of frustoconical shape.

According to a preferred embodiment, the guide chamber, which is positioned upstream from the fastening receptacle, comprises a flared section in direction opposite to the flare constituting the fastening receptacle. This arrangement, which gives the internal cavity of the socket body a general hourglass shape (meaning a shape of two inverted cones joined at their apex by a cylindrical zone), makes it easier to insert in and extract from the guide chamber a retaining sleeve, preferably rigid, which cooperates with the interior profile thereof to retain the cable. The intermediate section separating the fastening receptacle and the guide chamber then has a section of reduced diameter compared with these two parts.

A simple assembly bush mounted at the outlet of the guide chamber makes it possible to immobilize this sleeve in its functional position.

In addition to its primary function of stiffener, this sleeve protects the cable from contact with the metal body of the socket. It is also intended to absorb the slight residual deviations of the cable that might still exist at the outlet of its end socket.

In a preferred embodiment, the sleeve has a rigidity and thickness that decrease progressively with distance from the intermediate section. In this way the sleeve has a flexibility that increases progressively toward the outlet of the socket.

The invention also has as an object a mooring cable in which one end at least is equipped with a socket such as defined according to the invention, the cable preferably being sheathed and composed of metal wires, of synthetic material or of a combination of these materials.

Other aspects, characteristics and advantages of the invention will become more apparent from the description hereinafter of an embodiment provided with reference to the single attached FIGURE showing a self-aligning socket according to the invention as viewed in longitudinal section along its axial symmetry plane.

Socket 10, shown mounted at the end of a mooring cable 22, comprises mainly a hollow socket body 12, preferably of metal, for example of forged, cast or machined steel. This body 12, of axial symmetry, has a shape elongated along its longitudinal axis 16. In this embodiment, it has an internal cavity 14, open at its ends, of general "hourglass" shape comprising three successive parts aligned on longitudinal axis 16 and which are, in the following order:
  a guide chamber 34 for cable 22, in which chamber a retaining sleeve 36 is inserted,
  an intermediate section 18 and
  a fastening receptacle 20 receiving the end of cable 22.

In this case fastening receptacle 20 has frustoconical shape, constructed such that it flares with distance from narrow intermediate section 18 along axis 16.

In this case narrow intermediate section 18 is a middle section in which the center of gravity G of socket 10 is situated. It is therefore particularly advantageous to provide that socket body 12 is equipped in this zone with means for coupling socket 10, in this case journals 30 and 30', with the element to be anchored.

Guide chamber 34 prolongs fastening receptacle 20 upstream on the other side of intermediate section 18. This guide chamber 34, equipped with sleeve 36, closely conforms to the end of cable 22, which it receives in order to fulfill its function as cable stiffener.

Depending on diverse anchoring applications, especially in the marine (or offshore) environment, mooring cable 22 may be traditionally formed of a helically twisted assembly of strands constituted of individual wires, or of cores 26 enveloped in a watertight sheath 24. These individual wires or these cores are themselves formed from wires of steel or of synthetic or mixed material (steel and synthetic materials).

It will be noted that intermediate section 18, the diameter of which is smaller than internal cavity 14, has a diameter compatible with the outside diameter of cable 22 coated with its protective sheath 24.

The fixation of socket 10 to the end of cable 22 is achieved in the following manner: socket 10 is set in place on the sheaf created by spreading the end of strands 26 of cable 22, after this has been stripped at its end. A molten metal or a synthetic material 28 is then poured from the top of cavity 14 in chamber 20, forming the fastening receptacle, with the result that, after it solidifies and/or hardens, the cable and the socket are made irreversibly integral, by the fact that a wedging cone is obtained by undercut effect.

To permit its fixation to an element to be anchored, in general a floating mobile element such as an offshore oil and gas platform or a loading buoy, but which may also be, at the other end of the cable, an anchor on the sea floor, etc., socket 10 comprises coupling means capable of cooperating with corresponding coupling means provided on the element to be anchored.

These coupling means are generally intended to assure a pivoting connection, preferably without play or with optimized play, which will permit continuous self-alignment of the socket with the cable on which it is fastened according to the different forces to which the anchoring system is subjected.

In the alternative embodiment described here, these coupling means are constituted by two journals 30 and 30' disposed oppositely such that their common axis of rotation 32 is orthogonal to longitudinal axis 16 of socket 10 and defines the pivoting axis thereof. The mobile element to be anchored will then be provided with coupling means of female type, such as bayonet clamps, in which the journals will then engage.

Preferably coupling means 30, 30' of socket 10 are disposed on socket body 12 such that their axis of rotation 32 passes close to the base of fastening receptacle 20, at the level of intermediate section 18.

In practice, and with reference to the present variant, it will be noted that a substantial effect of positioning of coupling means 30, 30' is obtained when pivoting axis 32 passes through the intermediate section of the socket indicated by R in the FIGURE, in other words a zone extending between the base of fastening receptacle 20 and the start of guide chamber 34.

Preferably socket 10 will be designed in order that its center of gravity G is located in this region R, and therefore in immediate proximity to pivoting axis 32, in order to achieve equilibrium that is no different or almost no different from that during its rotation around pivot 32.

The advantageous character of a flared shape for guide chamber 34, situated in the extension of intermediate section 18, on the side opposite fastening receptacle 20, is emphasized once again. Intermediate section therefore opens onto this chamber 34 of flared shape, in this case frustoconical, although it may nevertheless have other shapes, permitting guided retention and protection of the cable over a certain distance after intermediate zone 18, advantageously by virtue of the presence of a sleeve 36 of added plastic material.

Sleeve 36 is inserted into flared chamber 34, and its shape is complementary thereto. After socket 10 has been fastened on its cable 22, this sleeve 36 of plastic, preferably rigid material, becomes a retaining sleeve disposed around the cable. It then makes it possible to absorb the deviations thereof that could still occur at the outlet of the socket, and prevents or very greatly limits its kinking directly at the level of intermediate zone 18. Appropriate materials for sleeve 36 may be polyurethanes of diverse grades, among others.

Sleeve 36 is retained in guide chamber 34 by means in this case of a retaining ring 38 fixed to body 12 by a circle of screws 39.

It will be possible to provide an O-ring seal, although not illustrated, around cable 22 at the level of intermediate section 18.

In addition, sheath 24 of cable 22 may be blocked in place in socket 10 by means, for example, circlips or retaining rings engaging in an annular groove made in sheath 24 of the cable.

It is self-evident that the invention could not be limited to the exemplary embodiment considered, but that it extends to multiple variants and equivalents provided the main technical characteristics thereof are respected.

Its scope of application extends to any mooring line, in the case in which it is desired to directly assure natural self-alignment of the cable with its end socket or sockets so as to minimize the parasitic bending stresses to which the cable is subjected at the outlet thereof and which are very often responsible for its being prematurely scrapped.

The invention claimed is:

1. A self-aligning socket for mounting at the end of a mooring cable for an anchoring system of a mobile element, the socket comprising:
    a socket body having an internal cavity comprising a guide chamber for the mooring cable, an intermediate section and a fastening receptacle to receive and block the ends of the strands of the said mooring cable, and
    a coupler for coupling with the mobile massive element to be anchored, positioned on the socket body so as to define a pivoting axis of the said socket body passing through the intermediate section.

2. A self-aligning socket according to claim 1, wherein a center of gravity G of the socket is located at the level of the said intermediate section.

3. A self-aligning socket according to claim 2, wherein the pivoting axis passes through the center of gravity G of the said socket.

4. A self-aligning socket according to claim 1, further comprising a retaining sleeve inserted in the said guide chamber and of shape complementary thereto, the sleeve for enveloping the mooring cable.

5. An offshore mooring cable equipped at an end at least with a self-aligning socket according to claim 1, the said cable being provided with a watertight sheath enveloping an assembly of wires based on steel or synthetic materials or combinations thereof.

6. The self-aligning socket according to claim 1, wherein the coupler includes two journals.

7. The self-aligning socket according to claim 1, wherein the pivoting axis defined by the coupler is perpendicular to a longitudinal axis of the socket.

8. The self-aligning socket according to claim 1, wherein the coupler is positioned on the socket body so the pivoting axis passes close to the base of fastening receptable at the level of the intermediate section.

9. The self-aligning socket according to claim 1, wherein the coupler is positioned on the socket body so the pivoting axis passes through the intermediate section between the base of the fastening receptacle and a start of the guide chamber.

10. The self-aligning socket according to claim 2, wherein the center of gravity is located at the intermediate section between a base of the fastening receptacle and a start of the guide chamber.

11. The self-aligning socket according to claim 1, wherein the guide chamber has a frustoconical shape.

12. The self-aligning socket according to claim 4, wherein the retaining sleeve is retained in the guide chamber by a retaining ring fixed to the socket body and by screws.

13. The self-aligning socket according to claim 1, wherein the intermediate section has a width that is narrower than the a width of the guide chamber and narrower than a width of the fastening receptacle.

* * * * *

UNITED STATES PATENT AND TRADEMARK OFFICE
CERTIFICATE OF CORRECTION

PATENT NO. : 9,132,890 B2
APPLICATION NO. : 13/811563
DATED : September 15, 2015
INVENTOR(S) : Pierre-Francois Baron et al.

It is certified that error appears in the above-identified patent and that said Letters Patent is hereby corrected as shown below:

In the claims,

Column 6, line 14, Claim 1 should read

"A self-aligning socket for mounting at the end of a mooring cable for an anchoring system of a mobile element, the socket comprising:
    a socket body having an internal cavity comprising a guide chamber for the mooring cable, an intermediate section and a fastening receptacle to receive and block the ends of the strands of the mooring cable, and
    a coupler for coupling with the mobile element to be anchored, positioned on the socket body so as to define a pivoting axis of the socket body passing through the intermediate section."

instead of

"A self-aligning socket for mounting at the end of a mooring cable for an anchoring system of a mobile element, the socket comprising:
    a socket body having an internal cavity comprising a guide chamber for the mooring cable, an intermediate section and a fastening receptacle to receive and block the ends of the strands of the said mooring cable, and
    a coupler for coupling with the mobile massive element to be anchored, positioned on the socket body so as to define a pivoting axis of the said socket body passing through the intermediate section."

Column 6, line 45, Claim 8 should read

"The self-aligning socket according to claim 1, wherein the coupler is positioned on the socket body so the pivoting axis passes close to a base of the fastening receptacle at the level of the intermediate section."

Signed and Sealed this
Third Day of May, 2016

Michelle K. Lee
*Director of the United States Patent and Trademark Office*

CERTIFICATE OF CORRECTION (continued)
U.S. Pat. No. 9,132,890 B2 instead of

"The self-aligning socket according to claim 1, wherein the coupler is positioned on the socket body so the pivoting axis passes close to the base of fastening receptable at the level of the intermediate section."

Column 6, line 63, Claim 13 should read

"The self-aligning socket according to claim 1, wherein the intermediate section has a width that is narrower than a width of the guide chamber and narrower than a width of the fastening receptacle."

instead of

"The self-aligning socket according to claim 1, wherein the intermediate section has a width that is narrower than the a width of the guide chamber and narrower than a width of the fastening receptacle."